(12) United States Patent
Hong et al.

(10) Patent No.: US 9,786,247 B2
(45) Date of Patent: Oct. 10, 2017

(54) WEARABLE DISPLAY DEVICE

(71) Applicant: Samsung Display Co., LTD., Yongin, Gyeonggi-Do (KR)

(72) Inventors: Won-Ki Hong, Suwon-si (KR); Jong Seo Lee, Yongin-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 41 days.

(21) Appl. No.: 14/820,224

(22) Filed: Aug. 6, 2015

(65) Prior Publication Data

US 2016/0259430 A1    Sep. 8, 2016

(30) Foreign Application Priority Data

Mar. 3, 2015    (KR) .................. 10-2015-0030004

(51) Int. Cl.
*G09G 5/00* (2006.01)
*G06F 1/16* (2006.01)

(52) U.S. Cl.
CPC ............. *G09G 5/003* (2013.01); *G06F 1/163* (2013.01); *G06F 1/1622* (2013.01); *G06F 1/1643* (2013.01); *G06F 1/1652* (2013.01); *G09G 2380/02* (2013.01)

(58) Field of Classification Search
None
See application file for complete search history.

(56) References Cited

U.S. PATENT DOCUMENTS

| 8,766,805 | B2 | 7/2014 | Alameh et al. | |
| 9,098,241 | B1* | 8/2015 | Cho | ........ H05K 1/028 |
| 2006/0209218 | A1 | 9/2006 | Lee et al. | |
| 2009/0126243 | A1 | 5/2009 | Schellingerhout et al. | |
| 2013/0044215 | A1 | 2/2013 | Rothkopf et al. | |
| 2013/0083496 | A1* | 4/2013 | Franklin | ........ G06F 1/1626 361/749 |
| 2013/0114193 | A1* | 5/2013 | Joo | ........ F16M 11/08 361/679.01 |
| 2013/0144193 | A1* | 6/2013 | Lewis, Jr. | ........ A61B 8/4281 601/2 |
| 2014/0320396 | A1* | 10/2014 | Modarres | ........ G06F 3/0412 345/156 |

(Continued)

FOREIGN PATENT DOCUMENTS

KR    10-2012-0085059 A    7/2012
KR    10-2014-0007689 A    1/2014

OTHER PUBLICATIONS

Strittmattter, J., Gümpel P., Chiru, A., Gheorghita, V., "Electrical Activation of the Shape Memory Effect for NiTi Wires," 2013, Fascicule 3, Jul.-Sep. Ed., pp. 65-68.*

*Primary Examiner* — Patrick Edouard
*Assistant Examiner* — Maheen Javed
(74) *Attorney, Agent, or Firm* — Innovation Counsel LLP (57) ABSTRACT

A wearable display device of the present invention includes: a wearable part configured for placement on a portion of a human body; a flexible display unit connected to the wearable part through a coupling part; at least one curvature changer configured to alter a curvature of at least a portion of the flexible display unit; and a curvature holder configured to maintain the curvature of the at least a portion of the flexible display unit once the curvature is altered by the at least one curvature changer.

11 Claims, 11 Drawing Sheets

(56) References Cited

U.S. PATENT DOCUMENTS

2015/0253848 A1\* 9/2015 Heubel .................. G06F 3/016
  345/173
2016/0095232 A1\* 3/2016 Zhang .................. G06F 1/1652
  361/807

\* cited by examiner

Applied Field

FIG. 9

WEARABLE DISPLAY DEVICE

CROSS-REFERENCE TO RELATED APPLICATION

This application claims priority to, and the benefit of, Korean Patent Application No. 10-2015-0030004 filed in the Korean Intellectual Property Office on Mar. 3, 2015 the entire contents of which are incorporated herein by reference.

BACKGROUND OF THE INVENTION (a) Field of the Invention

Embodiments of the present invention relate generally to display devices, and more specifically relate to wearable display devices.

(b) Description of the Related Art

Recently, a variety of wearable display devices using conventional displays, such as smart watches and head-mounted display devices, have been developed. However, unlike a TV, a monitor, or the like, depending on where it is attached to the user's body, wearable display devices have been found to have certain disadvantageous limitations. In the case of the smart watch for example, the display area is limited in size so as to not disturb or interfere with the user's behavior.

Various methods to solve these problems have been attempted. For example, in a band type of display device, a display device that is usually worn around a wrist and is unwound from the wrist when viewing images to show a long screen been proposed. However, the band type of display device requires a detaching process to show the long screen, and is thus somewhat inconvenient to use.

Accordingly, ongoing efforts exist to increase the size of the display area of wearable display devices, while also minimizing inconvenience to the user.

The above information disclosed in this Background section is only for enhancement of understanding of the background of the invention and therefore it may contain information that does not form the prior art that is already known in this country to a person of ordinary skill in the art.

SUMMARY OF THE INVENTION

Embodiments of the present invention provide a wearable display device that maximizes display area size while minimizing inconvenience to the user.

A wearable display device according to an exemplary embodiment of the present invention includes: a wearable part configured for placement on a portion of a human body; a flexible display unit connected to the wearable part through a coupling part; at least one curvature changer configured to alter a curvature of at least a portion of the flexible display unit; and a curvature holder configured to maintain the curvature of the at least a portion of the flexible display unit once the curvature is altered by the at least one curvature changer.

The at least one curvature changer and the curvature holder may be driven in a time divided manner.

The flexible display unit may be configured to be driven in a first mode in which the curvature of the at least a portion of the flexible display unit corresponds to the curvature of the wearable part, and in a second mode that the curvature of the at least a portion of the flexible display unit is smaller than the curvature of the at least a portion of the flexible display unit when in the first mode.

Upon a transition from the first mode to the second mode, and after the curvature changer increases the curvature of the at least a portion of the flexible display unit so as to generate an increased degree of curvature of the at least a portion of the flexible display unit, and the curvature holder may be configured to maintain the increased degree of curvature.

Upon a transition from the second mode to the first mode, the curvature holder may be configured to no longer maintain the curvature of the flexible display unit, and the curvature changer may be configured to alter the curvature of the at least a portion of the flexible display unit to correspond to the curvature of the worn part.

The curvature changer may include at least one of an electroactive polymer, a shape memory alloy, a shape memory polymer, a mechanical actuator, and an electrical actuator.

The curvature holder may include at least one of an Electro-Rheological (ER) fluid and a Magneto-Rheological (MR) fluid.

The curvature changer and the curvature holder may be configured to be driven during a display off-period.

An electromagnetic interference (EMI) shielding layer may be interposed between the curvature changer and the curvature holder, and the flexible display unit.

The flexible display unit may have a front surface and a rear surface opposite the front surface and facing the wearable part, wherein the flexible display unit may be configured to display an image on at least one of the front surface and the rear surface.

The flexible display unit has a first area, a second area, and a third area. The flexible display unit may be configured to display the image in the second area during the first mode, the flexible display unit may be configured to display the image in the third area during the second mode, and the third area may include the second area and may be larger than the second area.

The flexible display unit may be rotatably coupled to the wearable part.

According to an exemplary embodiment of the present invention, while minimizing inconvenience of the user, a wearable display device with a larger display area may be provided.

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. The Figures are thus not necessarily to scale. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

All numerical values are approximate, and may vary. All examples of specific materials and compositions are to be taken as nonlimiting and exemplary only. Other suitable materials and compositions may be used instead.

Figure 1:
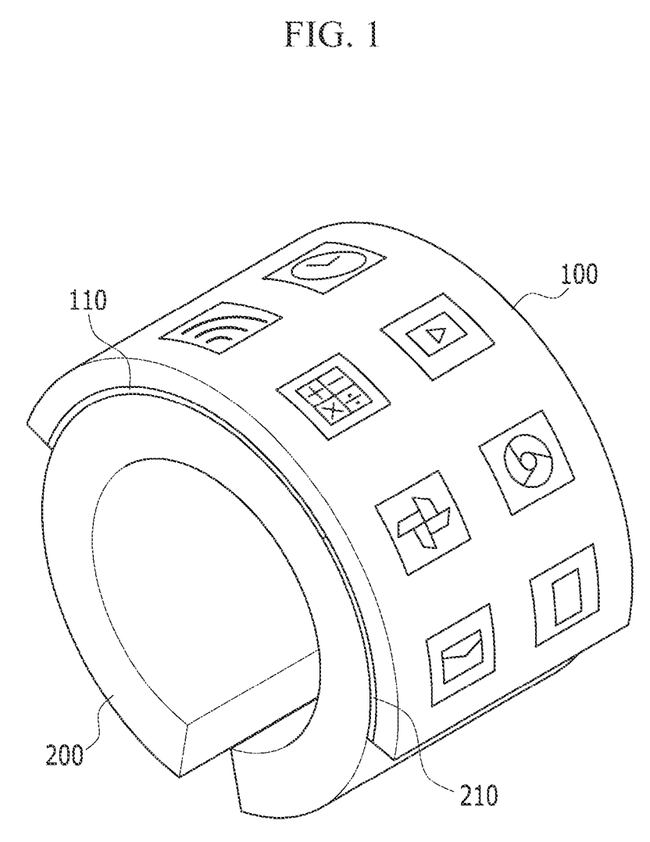
FIG. 1 is a perspective view of a wearable display device according to an exemplary embodiment of the present invention.

FIG. 1 is a perspective view of a wearable display device according to an exemplary embodiment of the present invention. Referring to FIG. 1, a wearable display device according to an exemplary embodiment of the present invention includes a flexible display unit 100 and a worn part 200.

The worn part 200 may be configured of a material such as a plastic, a metal, a rubber, or another material that is harmless to a human body, although the worn part 200 is not limited to these materials, and may utilize any suitable materials.

The worn part 200 can be in any form as long as it can be worn on the user's wrist. An attachable or detachable magnet (not shown) may be included at both ends of the worn part of the present exemplary embodiment, thereby providing ease of removal for the user.

The worn part 200 may include a coupling part 210 as a selective element. This will be described later with reference to FIG. 4.

The flexible display unit 100 is a display unit having a flexible characteristic rather than a rigid characteristic. The flexible display unit 100 may be made flexible by using a flexible plastic such as a polyimide, rather than glass, as its insulation substrate.

It is sufficient for the flexible display unit 100 of the present invention to have the flexible characteristic, and is not limited by a configuration and materials thereof. That is, the flexible display unit 100 may be made of any materials, in any shape, so long as it remains sufficiently flexible to conform to a user's wrist.

The flexible display unit 100 provides images to the user through display screen, like any general display device. The flexible display unit 100 may further include a touch function as implemented by a touch screen panel (TSP) or may be realized by an in-cell type or an on-cell type.

In FIG. 1, the image is displayed through a front surface of the flexible display unit 100, however the image may instead be displayed through a rear surface facing the worn part 200, as described later. In this case, the front surface of the flexible display unit 100 functions as a passivation layer.

Figure 2A:
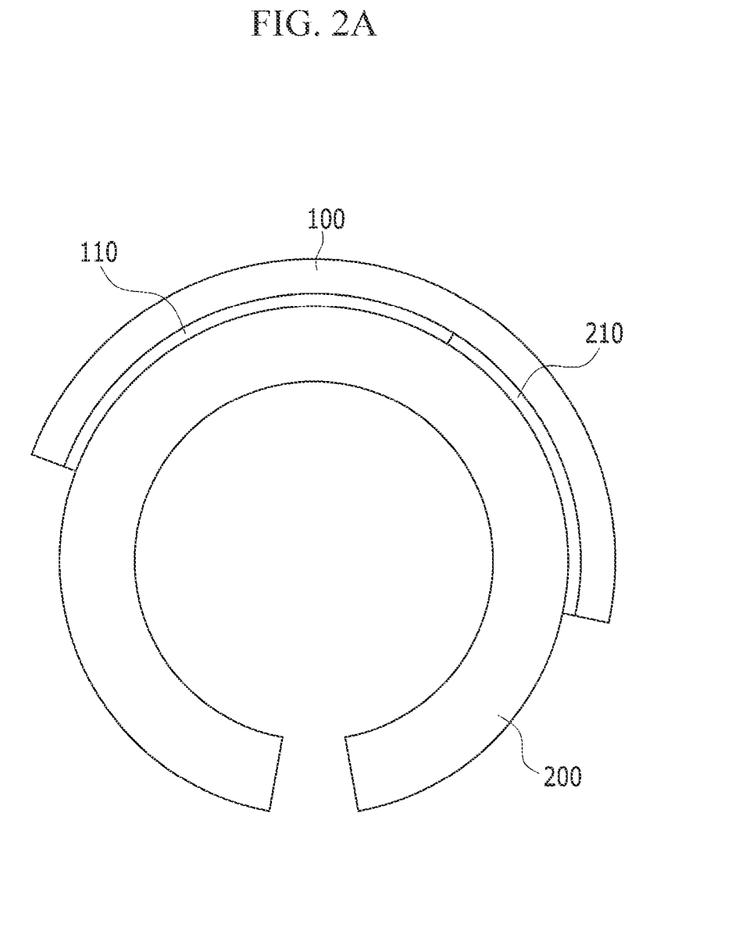
FIGS. 2A and 2B are side views of a wearable display device according to a first mode and a second mode, respectively.
Figure 2B:
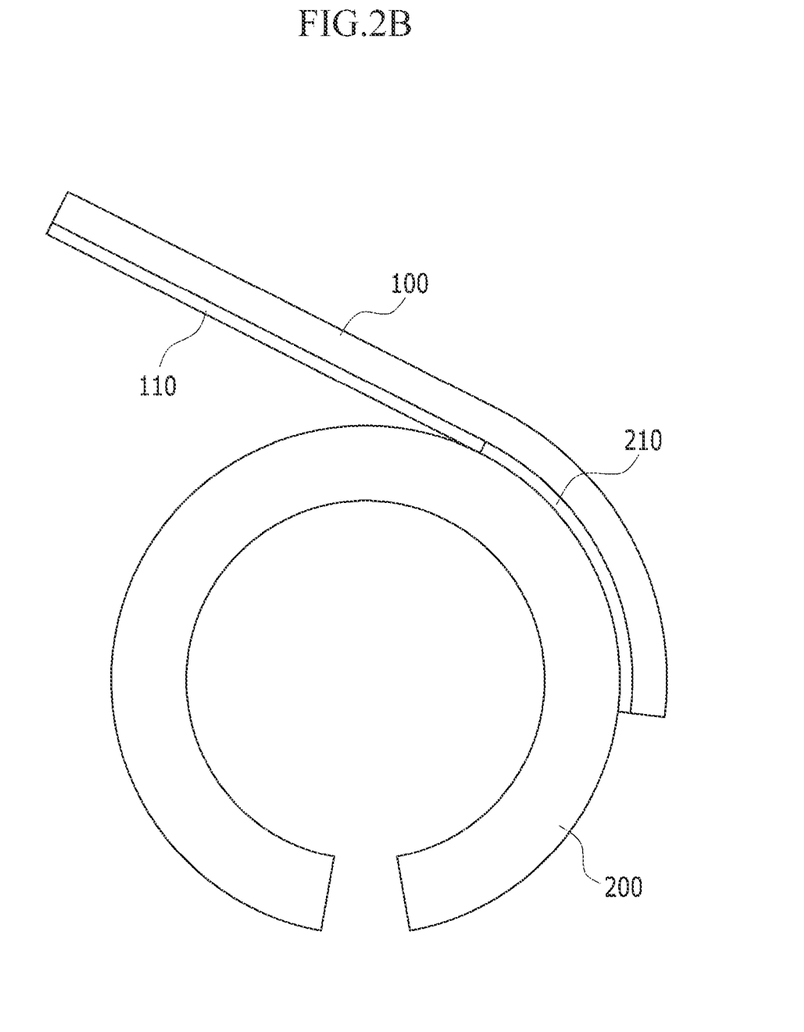

Also, the display area may be changed depending on a mode. FIGS. 2A and 2B are side views of a wearable display device according to a first mode and a second mode. FIG. 2A is a view showing a lateral surface of the wearable display device according to the first mode, and FIG. 2B is a view showing a lateral surface of the wearable display device according to the second mode.

The first mode is a mode in which at least part of the flexible display unit 100 corresponds to the curvature of the worn part 200, and the second mode is a mode in which at least part of the flexible display unit 100 does not correspond to the curvature of the worn part 200. That is, in the first mode, the flexible display unit 100 conforms to the shape of the outer surface of worn part 200, while in the second mode, the unit 100 only partially conforms thereto, and has a portion that does not. In this case, the portion that does not conform to the outer surface of worn part 200 is flat, or has a linear/straight profile in side view.

Referring to FIG. 2A, in the first mode, the flexible display unit 100 and the worn part 200 are close to each other, with the coupling part 210 and a first curvature changer 110 positioned inbetween. That is, in first mode, the flexible display unit 100 has a form such that it is coupled to the worn part 200 so as to be positioned close to the worn part 200 and to substantially conform thereto. Accordingly, the bending degree of the flexible display unit 100, that is, the curvature, is substantially the same as the curvature of the worn part 200 (at least, the outer surface thereof). That the curvature may somehow be changed by the configuration and the design between the display unit 100 and the worn part 200 is apparent to a person of ordinary skill in the art.

Referring to FIG. 2B, in the second mode, at least a portion of the flexible display unit 100 is separated from the worn part 200 to be substantially flat. In FIG. 2B, a portion of the flexible display unit 100 maintains the curvature of the first mode by corresponding to the region where the coupling part 210 is positioned, while in another region, the flexible display unit 100 is substantially flat, i.e. has a curvature that is close to 0.

Unlike the configuration of FIG. 2B, and as another exemplary embodiment, by minimizing the size of the region in which the flexible display unit 100 and the worn part 200 are coupled together, substantially the entire flexible display unit 100 may have a flat form that is at or near zero curvature.

Figure 3:
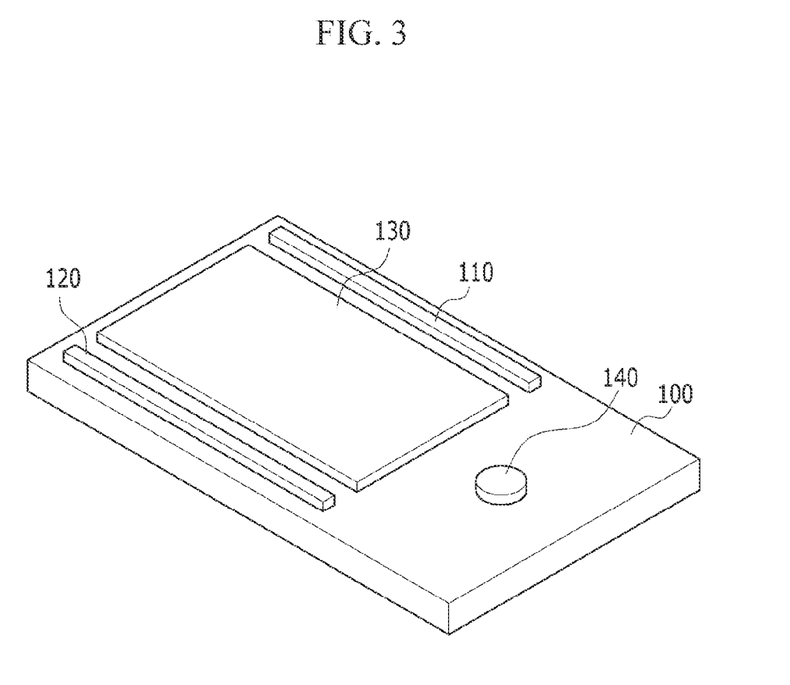
FIG. 3 is a view showing a rear surface of a flexible display unit according to an exemplary embodiment of the present invention.

FIG. 3 is a view showing a rear surface of a flexible display unit according to an exemplary embodiment of the present invention. The rear surface of the flexible display unit 100 is the surface facing the worn part 200. The front surface of the flexible display unit 100 is a surface opposite to the rear surface.

Referring to FIG. 3, a first curvature changer 110, a second curvature changer 120, a curvature holder 130, and a protrusion 140 are disposed on the rear surface of the flexible display unit 100.

The first and second curvature changers 110 and 120 are structures for changing at least a portion of the curvature of the flexible display unit 100. In the exemplary embodiment of FIG. 3, two curvature changers are shown, although any number of curvature changers is contemplated.

The curvature changers 110 and 120 may include at least one from among an electroactive polymer, a shape memory alloy, a shape memory polymer, a mechanical actuator, and an electrical actuator.

A case that the curvature changers 110 and 120 are formed of an ionic electroactive polymer will be described in detail in FIGS. 6A and 6B.

The curvature holder 130 has a function of fixing at least a partial curvature of the flexible display unit 100. That is, the curvature holder 130 serves to firmly maintain a current bending state, i.e. it acts to hold the flexible display unit 100 in its current shape.

Although one curvature holder 130 is shown in FIG. 3, the curvature holder 130 may be divided depending on a product design and the driving to be disposed on multiple portions of the flexible display unit 100. Any number of such divisions, placed anywhere on unit 100, is contemplated.

Also, in the present exemplary embodiment, the curvature holder 130 is disposed to only cover a portion of the flexible display unit 100, however the curvature holder 130 may be disposed to correspond to the whole region of the flexible display unit 100. That is, the curvature holder 130 may be sized and placed to cover any portion or amount of the rear surface of unit 100.

The curvature holder 130 may include at least one of an ER fluid (Electro-Rheological fluid) and an MR fluid (Magneto-Rheological fluid).

The case that the curvature holder 130 is formed of an ER fluid will be described later in FIG. 7 and FIG. 8.

Next, the driving of the curvature changers 110 and 120 and the curvature holder 130 will be described. In one embodiment, the curvature changers 110 and 120 and the curvature holder 130 are driven with time division.

When the user desires the display area of the large screen, the wearable display device of the present invention may be changed from the first mode to the second mode.

Firstly, the curvature changers 110 and 120 change at least a portion of the curvature of the flexible display unit 100 to be smaller than the curvature in the first mode. That is, at least a portion of the flexible display unit 100 is changed from curved to flat, thereby forming the shape of FIG. 2B. When the curvature changers 110 and 120 are operating, the curvature holder 130 is not driven, and it does not affect the change of curvature of the flexible display 100.

Next, when the driving of the curvature changer 110 and 120 is finished, the driving of the curvature holder 130 begins. The curvature holder 130 fixes, or maintains, the curvature of the flexible display unit 100 that was imparted by the curvature changers 110 and 120.

In particular, when the user's touch, etc. is applied, it is desirable for the flexible display 100 to be somewhat rigid, and the curvature change group (110, 120) alone may not be able to maintain the curvature of display 100 under the pressure of a touch. Also, when the power required to drive the curvature changer 110 and 120 is large, the curvature changers 110, 120 may need some assistance. The curvature holder 130 provides this help.

When the user finishes watching the image and moves to a destination, the user may desire a small screen that can be worn more easily and which does not interfere with movement or other tasks. In this case, the user may change the wearable display device of the present invention from the second mode to the first mode.

Firstly, the driving of the curvature holder 130 is ended, such that the fixing of the curvature of the flexible display unit 100 is released. That is, the flexible display unit 100 becomes flexible again.

Next, the driving of the curvature changers 110 and 120 is initiated, such that the curvature of the flexible display unit 100 of the flexible state is changed. As shown in FIG. 2A, the curvature of the flexible display unit 100 is changed (increased) to correspond to the curvature of the worn part 200.

Optionally, after the driving of the curvature changers 110 and 120 is finished, the curvature holder 130 may be driven to maintain the shape of the first mode.

The driving of the curvature changers 110 and 120 and the curvature holder 130 may affect the image display of the flexible display unit 100 and the touch driving of the touch screen panel. Accordingly, the user may encounter undesired experiences such as a moiré effect on the displayed image, or inaccurate touch recognition.

To prevent this, although not shown in the drawing, an EMI (Electro Magnetic Interference) shielding layer may be interposed between the flexible display unit 100, and the curvature changers 110 and 120 and the curvature holder 130. The EMI shielding layer may have a thin planar or sheetlike shape. The EMI shielding layer may be formed of a conductive material. For example, it may be formed of a metallic material or a ferromagnetic substance.

Also, to solve the described problem, the curvature changers 110 and 120 and the curvature holder 130 may be driven in a display off-period. That is, the curvature changers 110/120 and curvature holder 130 may be activated or driven when the display is off, or no image is being displayed.

In general, the display unit writes the data voltage to the capacitor of each pixel circuit depending on a scanning signal sequentially applied to each pixel row, and has an emission period after the writing.

The curvature changer 110 and 120 and the curvature holder 130 may switch between the above-described first mode and second mode at times other than these data recording periods.

The display off-period may mean the above-described emission period, or may mean a V-porch period during which the display frame is changed. However, this is only an example, and any period that does not alter the image of the display may be regarded as the display off-period.

The protrusion 140 as a selective configuration may be coupled to the coupling part 210 of the worn part 200. In detail, it may be coupled to a coupling hole 220 (see FIG. 4). The protrusion 140 and coupling hole 220 may form, for example, a snap-fit connector allowing the flexible display unit 100 to be removably attached to the worn part 200. Accordingly, the flexible display unit 100 and the worn part 200 may be coupled to each other.

Figure 4:
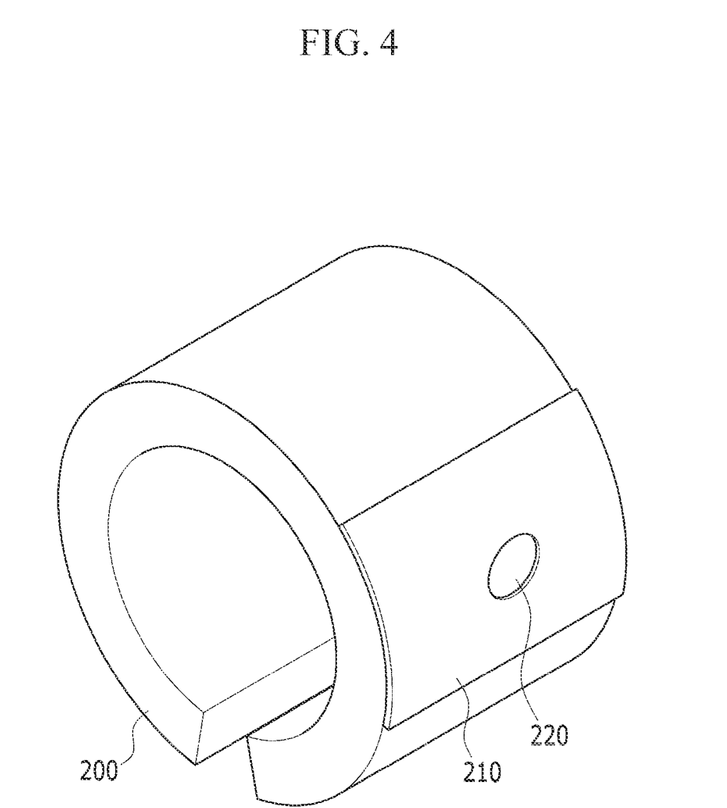
FIG. 4 is a view showing a worn part according to an exemplary embodiment of the present invention.

FIG. 4 is a view showing a worn part 200 according to an exemplary embodiment of the present invention.

Referring to FIG. 4, the worn part 200 according to an exemplary embodiment of the present invention may selectively include the coupling part 210. As described above, the coupling part 210 may be coupled to the protrusion 140 of the flexible display unit 100. In detail, the coupling hole 220 and the protrusion 140 may be coupled. In this case, one or both of the protrusion 140 and the coupling part 210 may include a material having magnetism, to allow the two to be magnetically attached to, and detached from, each other. However, the shape and construction of the protrusion 410 and the coupling part 210 of the present invention is only one exemplary embodiment, and as long as the flexible display unit 100 and the worn part 200 can be combined with each other, they may be implemented in any form.

Figure 5:
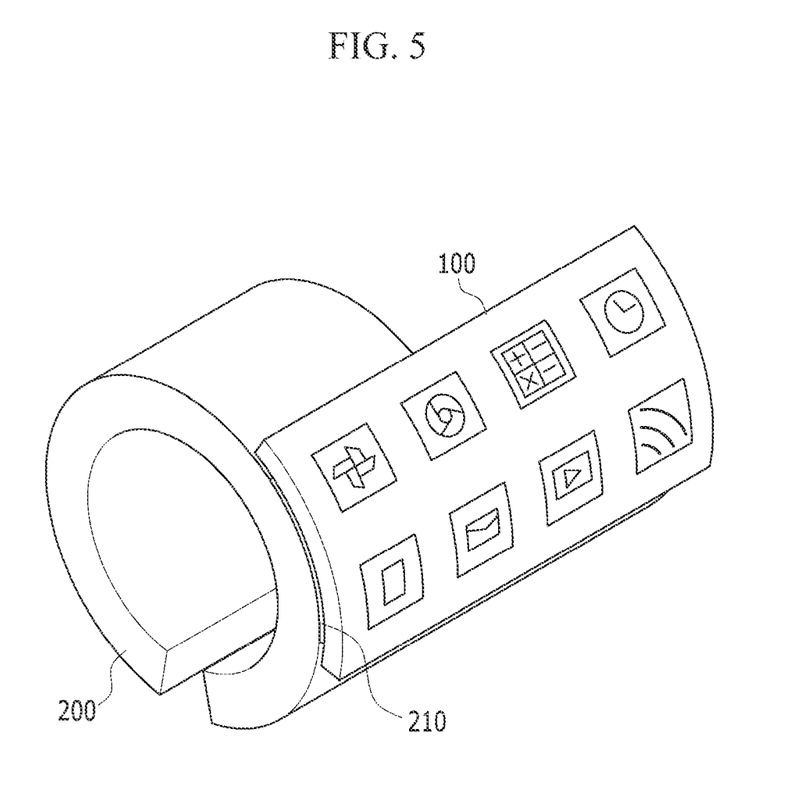
FIG. 5 is a view showing a state in which a flexible display unit is rotated.

FIG. 5 is a view showing a state in which a flexible display unit 100 is rotated.

Referring to FIG. 5, the flexible display unit 100 may be rotated while it is still attached to the worn part 200, and is shown here after being rotated into a horizontal screen mode.

The user may rotate the flexible display unit 100 to view images that are wider than they are tall. To realize the horizontal screen mode shown in FIG. 5, it may be preferable that at least one curvature changer 110/120 is oriented perpendicular to the orientation of the curvature changers 110 and 120 shown in FIG. 3.

In FIG. 5, since the protrusion 140 is positioned at a bottom of the rear surface of the flexible display unit 100, on the display unit 100 is rotated to the right, as shown. However, this is only one exemplary embodiment, and if the protrusion 140 is positioned for example at a center of the rear surface of the flexible display unit 100, the display unit 100 may essentially be rotated about its center, so as to be symmetric with respect to the worn part 200, i.e. each side of display unit 100 would extend outward the same distance from the respective edge of worn part 200. This can vary as desired.

Figure 6A:
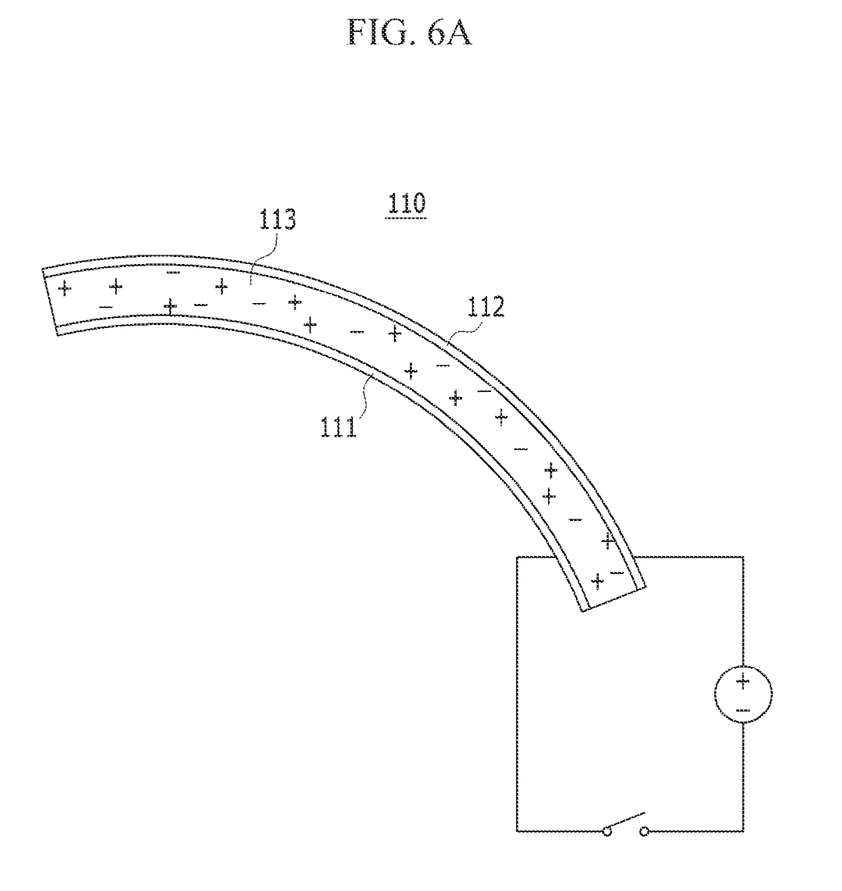
FIG. 6A and FIG. 6B are views to explain a shape change of a curvature changer depending on a voltage application according to an exemplary embodiment of the present invention.
Figure 6B:
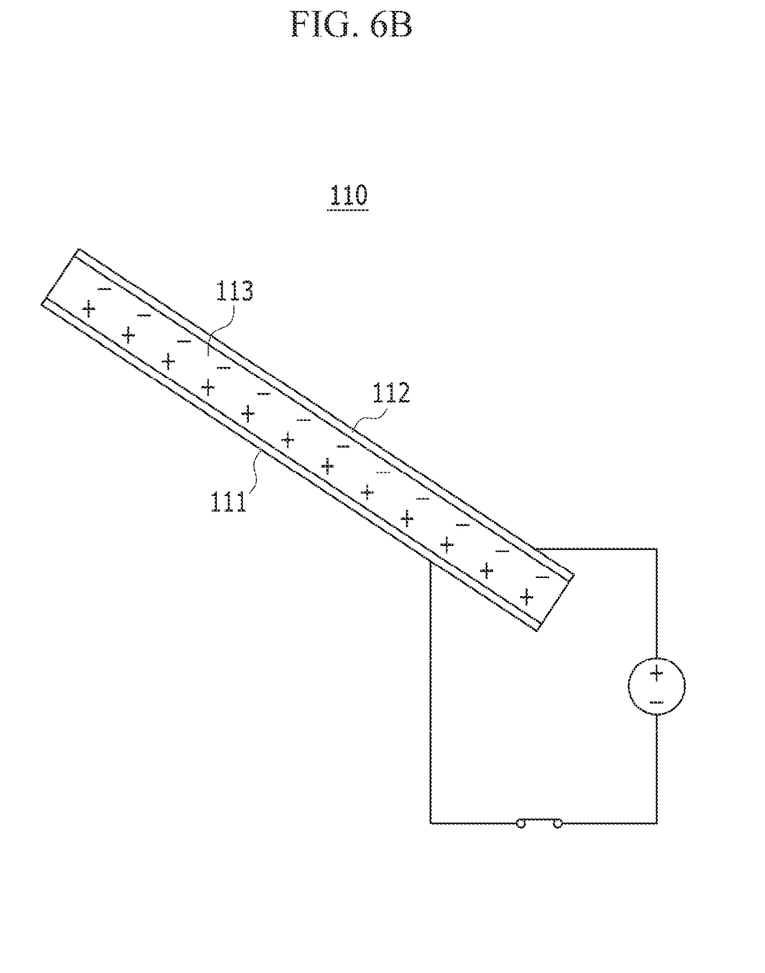

FIG. 6A and FIG. 6B are views to explain a shape change of a curvature changer according to an applied voltage, for an exemplary embodiment of the present invention.

FIGS. 6A and 6B show a curvature changer 110 configured as an ionic electroactive polymer 113, however they may include at least one from among a shape memory alloy, shape memory polymer, mechanical actuator, electric actuator, dielectric electroactive polymer, or the like. While FIGS. 6A and 6B only show curvature changer 110, curvature changer 120 may be configured similarly.

Referring to FIGS. 6A and 6B, the curvature changers 110 and 120 according to an exemplary embodiment of the present invention include an upper electrode 112, a lower electrode 111, and the ionic electroactive polymer 113 interposed therebetween. The ionic electroactive polymer 113 may be installed in a pocket formed between the two electrodes 111, 112.

Referring to FIG. 6A, when no voltage is applied across the two curvature changers 110 and 120, the curvature changers 110 and 120 may be designed to be bent corresponding to the curvature of the worn part 200.

Referring to FIG. 6B, if a voltage is applied between the upper electrode 112 and the lower electrode 111 to form an electric field, the curvature changers 110 and 120 may be induced to change their shape. This shape may be the bar shape in which the curvature is near 0.

In this case, a voltage difference between the upper electrode 112 and the lower electrode 111 may be about 3 V.

Figure 7:
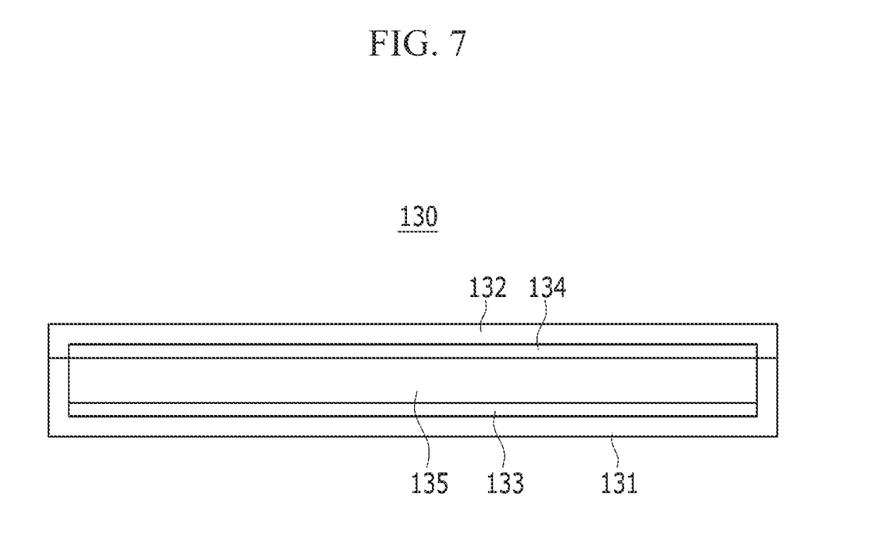
FIG. 7 is a view showing a curvature holder according to an exemplary embodiment of the present invention.

FIG. 7 is a view of a curvature holder according to an exemplary embodiment of the present invention. In FIG. 7, the curvature holder 130 includes an ER fluid 135. However, as described above, an MR fluid may alternatively be included.

Referring to FIG. 7, the curvature holder 130 according to an exemplary embodiment of the present invention includes a lower substrate 131, an upper substrate 132, a lower electrode 133, an upper electrode 134, and the ER fluid 135 interposed between the upper electrode 134 and the lower electrode 133.

The exemplary manufacturing method of the curvature holder 130 shown in FIG. 7 will be described.

Firstly, the upper electrode 134 is deposited on the upper substrate 132.

Also, the pattern is formed on the lower substrate 131, and the lower electrode 133 is deposited.

Next, the ER fluid 135 is injected onto the lower electrode 133.

Then, the upper substrate 132 is combined with the lower substrate 131 for bonding.

Figure 8:
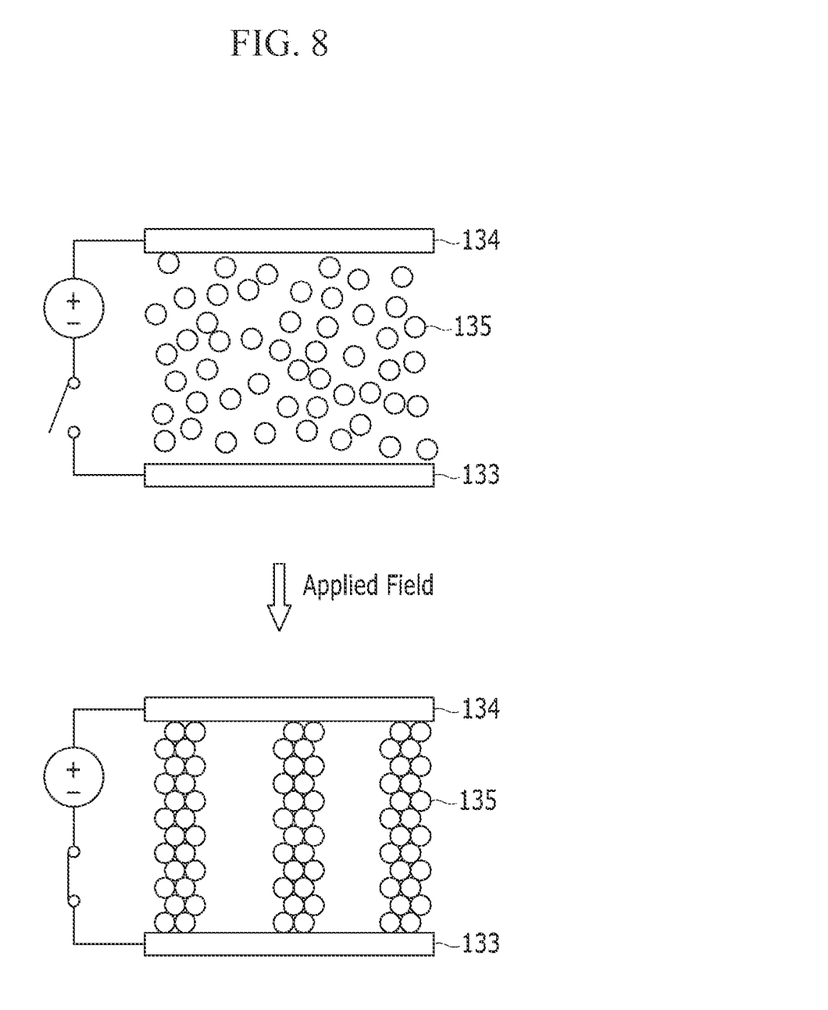
FIG. 8 is a view to explain a state of an ER fluid that is transformed according to a voltage application.

FIG. 8 is a view illustrating the change in state of an ER fluid according to a voltage application.

The ER fluid is a colloidal solution in which strongly conductive particles are dispersed in a non-conductive solvent.

Referring to FIG. 8, when no voltage is applied between the upper electrode 134 and the lower electrode 133, the ER fluid 135 is not subject to an electric field, and is thus present in a liquid state. In this case, the ER fluid 135 may be a Newtonian fluid, and the particles may freely move.

However, if an electric field is applied between the upper electrode 134 and the lower electrode 133, the ER fluid 135 becomes a solid or a gel. In this case, the ER fluid 135 may be a Bingham fluid, and the particles form a chain structure oriented substantially perpendicular to the electrodes 133 and 134, thereby having a yield stress.

The solid- or gel-state ER fluid 135 is of sufficient strength to maintain the curvature of the flexible display unit 100.

Although not shown, when using an MR fluid, one electrode has a coil shape to drive the curvature holder 130 by using a magnetic field according to the flow of current. The MR fluid is a colloidal solution in which paramagnetic particles are dispersed in a solvent of low permeability.

When using the ER fluid 135, the driving voltage is less than about 100 V, and the power consumption is about several tens of milliwatts. Also, a supporting force of about several kilopascals is demonstrated and ER fluid transparency may be about 85%. The response speed may correspond to several milliseconds, and the thickness may be realized at less than 100 um. However, the above-described values are but one example, and may be changed depending on, for example, the configuration material of the ER fluid 135.

When using the MR fluid, the driving voltage may be about 5 V, and the power consumption may be more than several tens of milliwatts. Also, a supporting force of about several kilopascals is demonstrated and the MR fluid may be opaque. The response speed may correspond to several milliseconds, and the thickness may be realized at less than 100 um.

Figure 9:
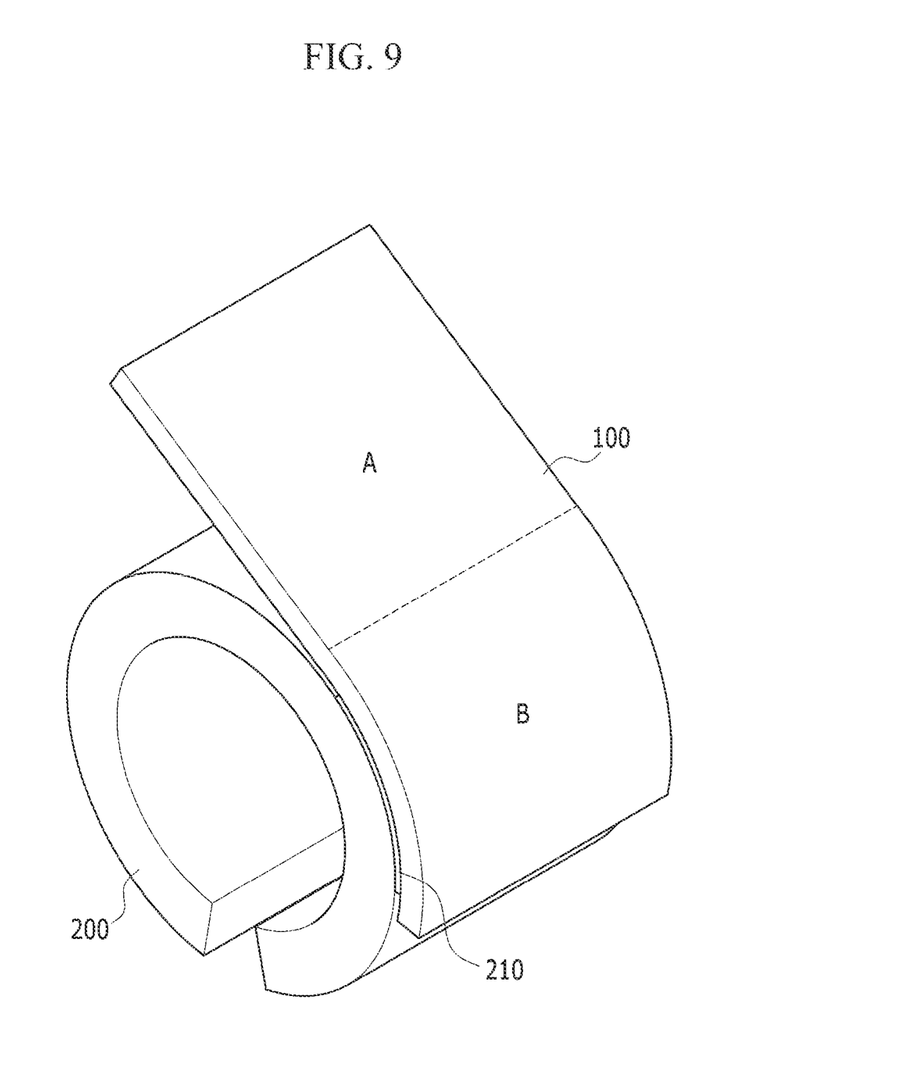
FIG. 9 is a view to explain a display area of a flexible display unit.

FIG. 9 is a view to explain a display area of a flexible display unit. Referring to FIG. 9, the wearable display device of the present invention is in the second mode. Accordingly, at least a portion of the flexible display unit 100 is unfolded so that its curvature is close to 0.

In this case, the region A or the region B may be referred to as a first region, and the sum of the region A and the region B may be referred to as a second region.

In the second mode of FIG. 9, the second region becomes the display area, thereby providing a large-sized screen.

However, in the first mode, since the entire flexible display 100 is in a rolled or curved form, the region A and the region B may not both be in the user's field of vision at the same time. Accordingly, the image may only be displayed in one of the region A and the region B, and the other region may be in the OFF state in which the image is not displayed.

The above-referenced drawings and the described detailed description of the invention are only illustrative for the present invention, and are used only for the purpose of describing the present invention but are not used to restrict the meaning or limit a range of the present invention described in claims. Therefore, it will be understood by those skilled in the art that various modifications and other equivalent exemplary embodiments may be possible. Accordingly, the true technical protection range of the present invention may be defined depending on the technical spirit of the accompanying claims. Furthermore, different features of the various embodiments, disclosed or otherwise understood, can be mixed and matched in any manner to produce further embodiments within the scope of the invention.

DESCRIPTION OF SYMBOLS

100: flexible display unit
110: first curvature changer
120: second curvature changer
130: curvature holder
140: protrusion
200: worn part
210: coupling part

What is claimed is:

1. A wearable display device comprising: a wearable part configured for placement on a portion of a human body;
   a flexible display unit connected to the wearable part through a coupling part;
   at least one curvature changer electrically driven to alter a curvature of at least a portion of the flexible display unit during a display-off period; and
   a curvature holder electrically driven to maintain the curvature of the at least a portion of the flexible display unit during the display-off period once the curvature is altered by the at least one curvature changer; and
   wherein the display off-period is a period that did not alter the image of the display.

2. The wearable display device of claim 1, wherein the at least one curvature changer and the curvature holder are configured to be driven in a time divided manner.

3. The wearable display device of claim 2, wherein the flexible display unit is configured to be driven in a first mode in which the curvature of the at least a portion of the flexible display unit corresponds to the curvature of the wearable part, and in a second mode in which the curvature of the at least a portion of the flexible display unit is smaller than the curvature of the at least a portion of the flexible display unit when in the first mode.

4. The wearable display device of claim 3, wherein upon a transition from the first mode to the second mode, and after the curvature changer increases the curvature of the at least a portion of the flexible display unit so as to generate an increased degree of curvature of the at least a portion of the flexible display unit, the curvature holder is configured to maintain the increased degree of curvature.

5. The wearable display device of claim 4, wherein upon a transition from the second mode to the first mode, the curvature holder is configured to no longer maintain the curvature of the flexible display unit, and the curvature changer is configured to alter the curvature of the at least a portion of the flexible display unit to correspond to the curvature of the worn part.

6. The wearable display device of claim 5, wherein the curvature changer includes at least one of an electroactive polymer, a shape memory alloy, a shape memory polymer, a mechanical actuator, and an electrical actuator.

7. The wearable display device of claim 5, wherein the curvature holder includes at least one of an Electro-Rheological (ER) fluid and a Magneto-Rheological (MR) fluid.

8. The wearable display device of claim 5, wherein an electromagnetic interference (EMI) shielding layer is interposed between the curvature changer and the curvature holder, and the flexible display unit.

9. The wearable display device of claim 5, wherein the flexible display unit has a front surface and a rear surface opposite the front surface and facing the wearable part, and wherein the flexible display unit is configured to display an image on at least one of the front surface and the rear surface.

10. The wearable display device of claim 5, wherein:
    the flexible display unit has a first area, a second area, and a third area,
    the flexible display unit is configured to display the image in the second area during the first mode,
    the flexible display unit is configured to display the image in the third area during the second mode, and
    the third area includes the second area and is a region that is larger than the second area.

11. The wearable display device of claim 1, wherein the flexible display unit is rotatably coupled to the wearable part.

\* \* \* \* \*